(12) United States Patent
Jadric et al.

(10) Patent No.: US 8,353,174 B1
(45) Date of Patent: *Jan. 15, 2013

(54) CONTROL METHOD FOR VAPOR COMPRESSION SYSTEM

(75) Inventors: Ivan Jadric, York, PA (US); Zhiqiao Wu, York, PA (US); Michael S. Todd, Jacobus, PA (US); Justin Drew Warner, Harrisburg, PA (US); Shreesha Adiga Manoor, York, PA (US); Konstantin Borisov, York, PA (US); Scott Victor Slothower, Dillsburg, PA (US); Kanishk Dubey, York, PA (US); John C. Hansen, Spring Grove, PA (US)

(73) Assignee: Johnson Controls Technology Company, Holland, MI (US)

( * ) Notice: Subject to any disclaimer, the term of this patent is extended or adjusted under 35 U.S.C. 154(b) by 719 days.

This patent is subject to a terminal disclaimer.

(21) Appl. No.: 12/572,975

(22) Filed: Oct. 2, 2009

Related U.S. Application Data

(60) Provisional application No. 61/102,687, filed on Oct. 3, 2008.

(51) Int. Cl.
*F25B 1/00* (2006.01)
*H02P 25/00* (2006.01)
*G05B 13/02* (2006.01)

(52) U.S. Cl. .......................... 62/228.4; 318/801; 700/28

(58) Field of Classification Search ................. 62/228.4, 62/498; 318/801; 429/427, 428; 700/28
See application file for complete search history.

(56) References Cited

U.S. PATENT DOCUMENTS 3,593,103 A  7/1971 Chandler et al.
(Continued)

FOREIGN PATENT DOCUMENTS

EP  0272776 A2  6/1988
(Continued)

OTHER PUBLICATIONS

Silicon Carbide npnp Thyristors, John H. Glenn Research Center, Cleveland, Ohio, downloaded from http://www.nasatech.com/Briefs/Dec00/LEW16750.html on Jan. 20, 2004, 3 pages.

(Continued)

*Primary Examiner* — Chen Wen Jiang
(74) *Attorney, Agent, or Firm* — McNees Wallace & Nurick LLC

(57) ABSTRACT

A chiller system is provided with a compressor, a condenser, and an evaporator connected in a closed refrigerant loop. A motor is connected to the compressor to power the compressor. A variable speed drive is connected to the motor. The variable speed drive is arranged to receive an input AC power at a fixed input AC voltage and a fixed input frequency and provide an output power at a variable voltage and variable frequency to the motor. The variable voltage has a maximum voltage greater in magnitude than the fixed input AC voltage and the variable frequency has a maximum frequency greater than the fixed input frequency. The variable speed drive includes a converter connected to an AC power source providing the input AC voltage, the converter is arranged to convert the input AC voltage to a DC voltage. A DC link is connected to the converter. The DC link is arranged to filter and store the DC voltage from the converter. An inverter is connected to the DC link. A controller is arranged to reference a first operating map associated with the compressor, a second operating map associated with the motor, and a third operating map associated with the variable speed drive. The controller further is arranged to analyze the first operating map second operating map and third operating map concurrently to select an operating point for the chiller system.

12 Claims, 6 Drawing Sheets

U.S. PATENT DOCUMENTS

| | | |
|---|---|---|
| 3,621,366 A | 11/1971 | Duff et al. |
| 4,308,491 A | 12/1981 | Joyner, Jr. et al. |
| 4,587,474 A | 5/1986 | Espelage et al. |
| 4,697,131 A | 9/1987 | Schauder et al. |
| 4,758,771 A | 7/1988 | Saito et al. |
| 4,761,726 A | 8/1988 | Brown |
| 4,864,483 A | 9/1989 | Divan |
| 4,959,602 A | 9/1990 | Scott et al. |
| 5,038,267 A | 8/1991 | De Donker et al. |
| 5,081,368 A | 1/1992 | West |
| 5,123,080 A | 6/1992 | Gillett et al. |
| 5,127,085 A | 6/1992 | Becker et al. |
| 5,298,848 A | 3/1994 | Ueda et al. |
| 5,410,230 A | 4/1995 | Bessler et al. |
| 5,483,142 A | 1/1996 | Skibinski et al. |
| 5,499,178 A | 3/1996 | Mohan et al. |
| 5,570,279 A | 10/1996 | Venkataramanan |
| 5,592,058 A | 1/1997 | Archer et al. |
| 5,625,549 A | 4/1997 | Horvat |
| 5,646,458 A | 7/1997 | Bowyer et al. |
| 5,747,955 A | 5/1998 | Rotunda et al. |
| 5,757,599 A | 5/1998 | Crane |
| 5,796,234 A | 8/1998 | Vrionis |
| 5,869,946 A | 2/1999 | Carobolante |
| 5,889,667 A | 3/1999 | Bernet |
| 5,909,367 A | 6/1999 | Change |
| 5,936,855 A | 8/1999 | Salmon |
| 5,969,966 A | 10/1999 | Sawa et al. |
| 6,005,362 A | 12/1999 | Enjeti et al. |
| 6,050,083 A | 4/2000 | Meckler |
| 6,072,302 A | 6/2000 | Underwood et al. |
| 6,118,676 A | 9/2000 | Divan et al. |
| 6,160,722 A | 12/2000 | Thommes et al. |
| 6,163,472 A | 12/2000 | Colby |
| 6,239,513 B1 | 5/2001 | Dean et al. |
| 6,276,148 B1 | 8/2001 | Shaw |
| 6,313,600 B1 | 11/2001 | Hammond et al. |
| 6,348,775 B1 | 2/2002 | Edelson et al. |
| 6,407,937 B2 | 6/2002 | Bruckmann et al. |
| 6,487,096 B1 | 11/2002 | Gilbreth et al. |
| 6,507,503 B2 | 1/2003 | Norrga |
| 6,559,562 B1 | 5/2003 | Rostron |
| 6,566,764 B2 | 5/2003 | Rebsdorf et al. |
| 6,603,675 B1 | 8/2003 | Norrga |
| 6,625,046 B2 | 9/2003 | Geissler |
| 6,657,874 B2 | 12/2003 | Yu |
| 6,658,870 B1 | 12/2003 | Jenkins |
| 6,686,718 B2 | 2/2004 | Jadric et al. |
| 6,704,182 B2 | 3/2004 | Bruckmann et al. |
| 6,768,284 B2 | 7/2004 | Lee et al. |
| 6,801,019 B2 | 10/2004 | Haydock et al. |
| 6,847,854 B2 * | 1/2005 | Discenzo .................. 700/99 |
| 7,005,829 B2 | 2/2006 | Schnetzka |
| 7,081,734 B1 | 7/2006 | Jadric et al. |
| 7,116,066 B2 | 10/2006 | Lin |
| 7,135,828 B2 | 11/2006 | Lin |
| 7,408,312 B2 | 8/2008 | Itou et al. |
| 7,411,329 B2 | 8/2008 | Murakami et al. |
| 7,555,912 B2 | 7/2009 | Schnetzka et al. |
| 7,948,136 B2 * | 5/2011 | Miyata ............... 310/156.45 |
| 7,992,388 B2 * | 8/2011 | Shu et al. ............... 60/605.1 |
| 2002/0176261 A1 | 11/2002 | Norrga |
| 2003/0015873 A1 | 1/2003 | Khalizadeh et al. |
| 2003/0052544 A1 | 3/2003 | Yamamoto et al. |
| 2003/0133317 A1 | 7/2003 | Norrga |
| 2003/0168919 A1 | 9/2003 | Friedrichs et al. |
| 2003/0231518 A1 | 12/2003 | Peng |
| 2004/0008005 A1 | 1/2004 | Sakai et al. |
| 2004/0012986 A1 | 1/2004 | Riggio et al. |
| 2005/0035677 A1 * | 2/2005 | Evans et al. ............... 310/156.35 |
| 2005/0057210 A1 | 3/2005 | Ueda et al. |
| 2005/0068001 A1 | 3/2005 | Skaug et al. |
| 2005/0190511 A1 | 9/2005 | Crane et al. |
| 2006/0208685 A1 | 9/2006 | Schnetzka |
| 2007/0063668 A1 * | 3/2007 | Schnetzka et al. ............ 318/812 |
| 2010/0083693 A1 * | 4/2010 | Todd et al. ............... 62/498 |

FOREIGN PATENT DOCUMENTS

| | | |
|---|---|---|
| EP | 0283954 A2 | 9/1988 |
| EP | 0422221 A1 | 11/1989 |
| EP | 1300937 A2 | 4/2003 |
| EP | 031336 A2 | 8/2008 |
| JP | 6105563 | 9/1992 |
| JP | 5068376 | 3/1993 |
| JP | 2002176767 | 6/2002 |
| JP | 4026374 | 9/2006 |
| WO | 9314559 A1 | 7/1993 |
| WO | 9732168 A1 | 9/1997 |
| WO | 2004098038 A1 | 11/2004 |

OTHER PUBLICATIONS

IGBT with Reverse Blocking Capability, IXYS Semiconductor GmbH, 2003, pp. 1-2.

Ahmed Elasser and T. Paul Chow, Silicon Carbide Benefits and Advantages for Power Electronics Circuits and Systems, Proceedings of the IEEE, vol. 90, No. 6, Jun. 2002, pp. 969-986.

Klumpner C. et al; "Using Reverse Blocking IGBTs in Power Converters for Adjustable Speed Drives", Conference Record of the 2003 IEEE Industry applications Conference 38th IAS Annual Meeting, Salt Lake City, UT, Oct. 12-16, 2003, vol. 3 of 3 Conf. 38, pp. 1516-1523 USA.

Ozipineci B. et al.: "4H-SiC GTO Thyristor and p-n Diode Loss Models for HVDC Converter", Industry Applications Conference 2004, 39th IAS Annual Meeting, conference record of the 2004 IEEE Seattle, WA USA, Oct. 2004, vol. 2, pp. 1238-1243.

Jue Wang et al.: "Evaluation of High-Voltage 4H-SiC Switching Devices" IEEE Transactions on Electron Devices, IEEE Service Center, Piscataway, NJ, vol. 46, No. 3, Mar. 1999.

Annabelle Van Zyl, Rene Spee, Alex Faveluke, and Shibashis Bhowmik; Voltange Sag Ride-Through for Adjustable-Speed Drives With Active Rectifiers; Nov./Dec. 1998; vol. 34, Issue No. 6; IEEE Transactions on Industry Applications.

Annette Von Jouanne, Prasad N. Enjeti, and Basudeb Banerjee; Assessment of Ride-Through Alternatives for Adjustable-Speed Drives; Jul./Aug. 1999; vol. 35, Issue No. 4; IEEE Transactions on Industry Applications.

Morimoto et al., "Expansion of Operating Limits for Permanent Magnet Motor by Current Vector Control Considering Inverter Capacity", IEEE Transactions on Industry Applications, vol. 26, Issue No. 5, Sep./ Oct. 1990.

Libor Prokop and Pavel Grasblum, "3-Phase PM Synchronous Motor Vector Control Using a 56F80x, 56F8100, or 56F8300 Device", Freescale Semiconductor: Application Note, AN1931, Rev. 3, Jan. 2005.

* cited by examiner

CONTROL METHOD FOR VAPOR COMPRESSION SYSTEM

This patent application claims the benefit of U.S. Provisional Patent Application No. 61/102,687, filed Oct. 3, 2008, entitled PERMANENT MAGNET MOTOR DRIVE AND CONTROLLER, for which priority is claimed and the disclosure of which is hereby incorporated by reference.

BACKGROUND

The application generally relates to a permanent magnet motor drive. The application relates more specifically to a variable speed drive (VSD) for controlling a permanent magnet motor that powers a compressor in heating, ventilation, air conditioning and refrigeration (HVAC&R) systems.

Currently VSDs are used to power a variety of motor types in HVAC&R systems. Common types of motors that are used for HVAC&R applications include induction motors, switched reluctance motors, and other synchronous and DC motors capable of handling the torque and speed ranges in such HVAC&R systems.

Permanent magnet synchronous motors (PMSM) are of particular interest for use as traction motors in electric vehicle designs due to their higher efficiency and higher power density as compared to regular DC motors and AC induction motors. PMSM motors typically operate with a permanent magnet rotor. A permanent magnet rotor may be configured with surface mounted permanent magnets or with interior permanent magnets having different arrangements. The PMSM is a rotating electric machine in which the stator might be similar to a stator of an induction motor and the rotor has surface-mounted or interior permanent magnets. However, a totally different stator design for a PMSM is possible and a stator design optimization is necessary even though the stator topology might be similar to an induction machine. The use of a permanent magnet to generate a substantial air gap magnetic flux makes it possible to design highly efficient PMSMs.

A PMSM that is driven by a sinusoidal current is referred to as a PMSM while, a PMSM that is driven by a rectangular 120° electrical phase-current waveform is can be referred to as a brushless dc (BLDC) machine. The rotor structure of the PMSM and BLDC might be the same such as surface-mounted permanent magnet rotor. Both the PMSM and BLDC are driven by currents coupled with the given rotor position. The angle between the generated stator flux linkage and the rotor flux linkage, which is generated by a rotor magnet, defines the torque, and thus speed, of the motor. Both the magnitude of the stator flux linkage and the angle between the stator flux linkage and rotor flux linkage are controllable to maximize the torque or minimize the losses. To maximize the performance of PMSM and ensure the system stability, the motor requires a power electronics converter for proper operation.

For a three-phase PMSM, a standard three-phase power output stage is used, which is the same power stage that is used for AC induction motors. The power stage utilizes six power transistors with independent switching. The power transistors are switched in the complementary mode. The fundamental sine wave output is generated using a PWM technique.

Heretofore PMSM motors and their associated VSDs have been limited in their application in commercial and industrial scale HVAC&R systems, largely due to factors relating to relatively low performance requirements from old HVAC&R systems, higher system cost, and complicated control system design.

SUMMARY

The present invention relates to a vapor compression system including a compressor, a condenser, and an evaporator connected in a closed refrigerant loop. A motor is connected to the compressor to power the compressor. A variable speed drive is connected to the motor. The variable speed drive is arranged to receive an input AC power at a fixed input AC voltage and a fixed input frequency and provide an output power at a variable voltage and variable frequency to the motor. The variable voltage has a maximum voltage greater in magnitude than the fixed input AC voltage and the variable frequency has a maximum frequency greater than the fixed input frequency. The variable speed drive includes a converter connected to an AC power source providing the input AC voltage, the converter is arranged to convert the input AC voltage to a DC voltage. A DC link is connected to the converter. The DC link is arranged to filter and store the DC voltage from the converter. An inverter is connected to the DC link. A controller is arranged to reference a first operating map associated with the compressor, a second operating map associated with the motor, and a third operating map associated with the variable speed drive. The controller further is arranged to analyze the first operating map second operating map and third operating map concurrently to select an operating point for the vapor compression system.

The present invention also relates to a chiller system including a compressor, a condenser, and an evaporator connected in a closed refrigerant loop. A motor is connected to the compressor to power the compressor. A variable speed drive is connected to the motor. The variable speed drive is arranged to receive an input AC power at a fixed input AC voltage and a fixed input frequency and provide an output power at a variable voltage and variable frequency to the motor. The variable voltage has a maximum voltage greater in magnitude than the fixed input AC voltage and the variable frequency has a maximum frequency greater than the fixed input frequency. The variable speed drive includes a converter connected to an AC power source providing the input AC voltage, the converter is arranged to convert the input AC voltage to a DC voltage. A DC link is connected to the converter. The DC link is arranged to filter and store the DC voltage from the converter. An inverter is connected to the DC link. A controller is arranged with adaptive controls to apply fuzzy logic algorithms for optimization of the motor, the compressor and the variable speed drive.

DETAILED DESCRIPTION OF THE EXEMPLARY EMBODIMENTS

Figure 1:
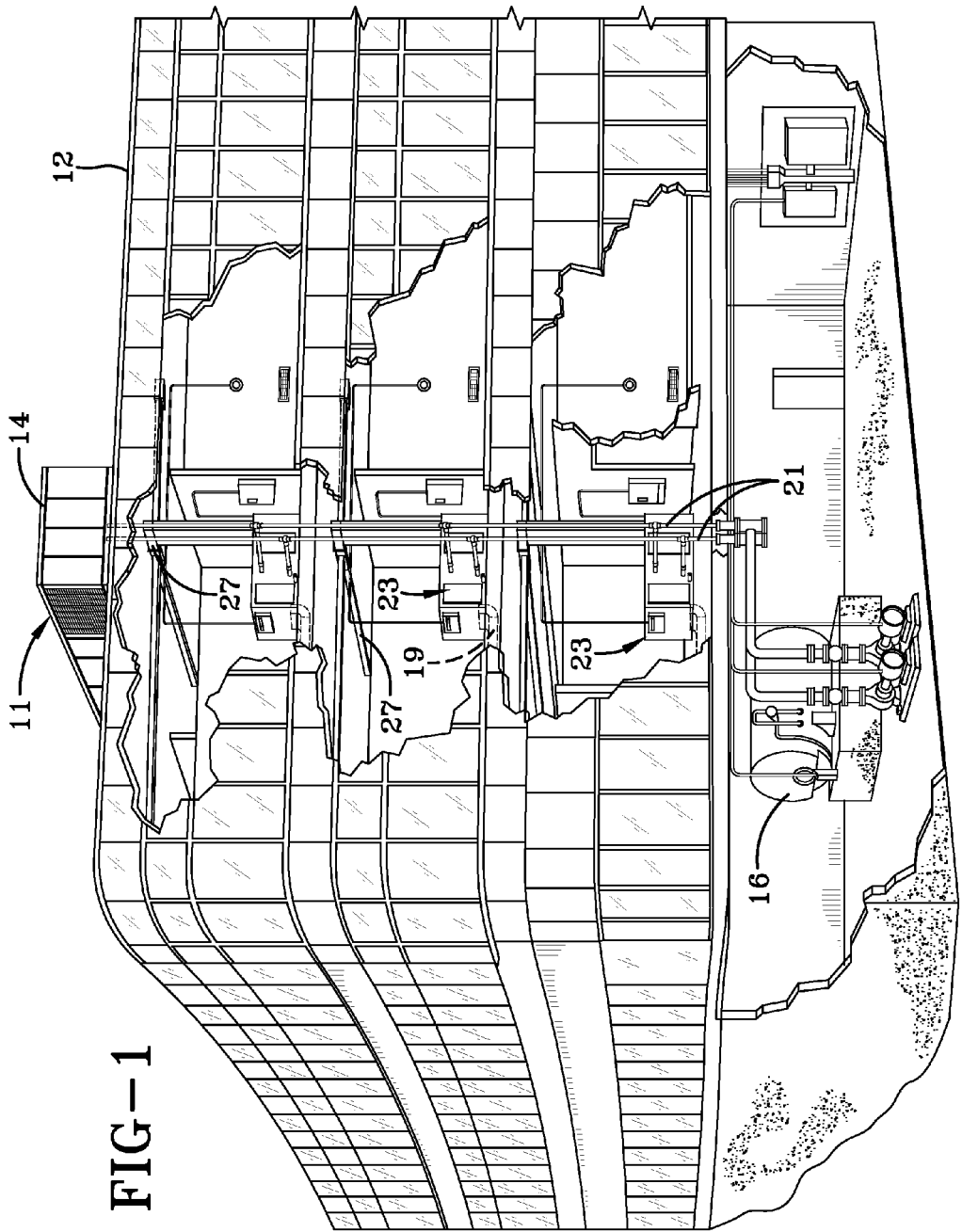
FIG. 1 shows an exemplary embodiment of a Heating, Ventilation, Air Conditioning and Refrigeration (HVAC&R) system in a commercial environment.

FIG. 1 shows an exemplary environment for a Heating, Ventilating, Air Conditioning system (HVAC system) 11 in a building 12 for a commercial setting. HVAC system 11 may include a compressor incorporated into a vapor compression system 10 that can supply a chilled liquid that may be used to cool building 12. HVAC system 11 can also include a boiler 17 used to heat building 12, and an air distribution system that circulates air through building 12. The air distribution system can include an air return duct 19, an air supply duct 27 and an air handler 23. Air handler 23 can include a heat exchanger that is connected to boiler 17 and vapor compression system 10 by conduits 21. The heat exchanger in air handler 23 may receive either heated liquid from boiler 17 or chilled liquid from vapor compression system 10, depending on the mode of operation of HVAC system 11. HVAC system 11 is shown with a separate air handler on each floor of building 12, but it will be appreciated that these components may be shared between or among floors.

Figure 2:
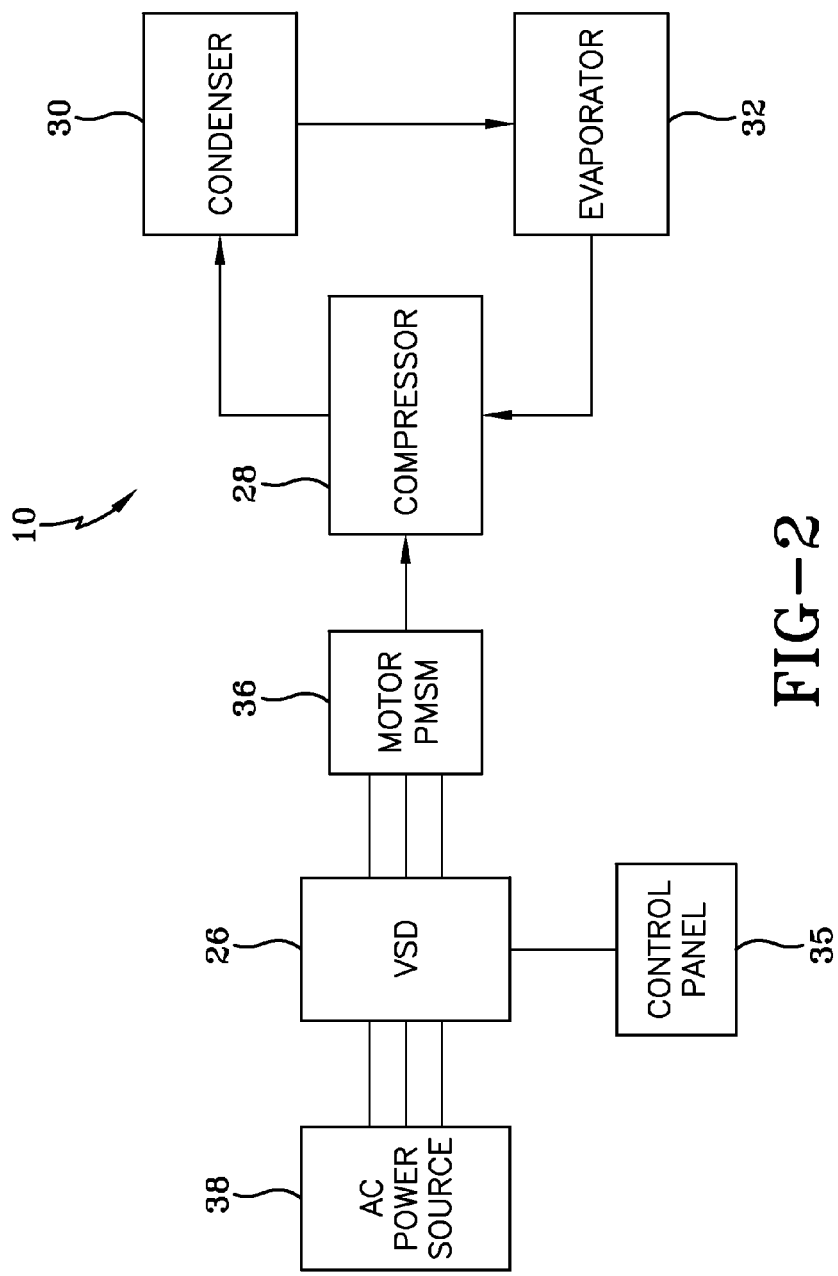
FIG. 2 schematically illustrates an exemplary embodiment of vapor compression system that may be used in the exemplary embodiment of FIG. 1.

FIG. 2 illustrates generally an exemplary configuration for powering HVAC&R system with a variable speed drive (VSD) 26 that may be used in building 12 in FIG. 1. An AC power source 38 supplies AC power to VSD 26, which in turn, supplies AC power to a motor, for example, PMSM 36. In another embodiment, VSD 26 can power more than one motor. PMSM 36 is used to drive a corresponding compressor 28 of a refrigeration or chiller system 100. Chiller system 100 includes a compressor 28, a condenser 30, a water chiller or evaporator 32, and a control panel 35. The compressor 28, condenser 30 and evaporator 32 are connected in a closed refrigerant loop. AC power source 38 provides single phase or multi-phase (e.g., three phase), fixed voltage, and fixed frequency AC power to VSD from an AC power grid or distribution system that is present at a site. AC power source 38 can supply a three phase AC voltage or nominal line voltage of 200 V, 230 V, 380 V, 460 V, or 600 V, at a nominal line frequency of 50 Hz or 60 Hz to VSD 26 depending on the corresponding AC power grid. It is to be understood that AC power source 38 can provide any suitable fixed nominal line voltage or fixed nominal line frequency to VSD 26 depending on the configuration of the AC power grid. In addition, a particular site can have multiple AC power grids that can satisfy different line voltage and line frequency requirements. For example, a site may have a 230 VAC power grid to handle certain applications and a 460 VAC power grid to handle other applications.

VSD 26 receives AC power having a particular fixed line voltage and fixed line frequency from AC power source and provides AC power to PMSM 36 at a desired voltage and desired frequency, both of which can be varied to satisfy particular requirements. VSD 26 may include the ability to provide AC power to the PMSM 36 having higher voltages and frequencies or lower voltages and frequencies than the fixed voltage and fixed frequency received from AC power source 38. PMSM 36 may have a predetermined rated voltage and frequency that is greater than the fixed AC input voltage and frequency, however the rated motor voltage and frequency may also be equal to or lower than the fixed AC input voltage and frequency.

HVAC system 11 may include compressor 28, a condenser 30, a liquid chiller or evaporator 32 and a control panel 35. Compressor 28 is driven by motor 36 that is powered by VSD 26. VSD 26 may be, for example, a vector-type drive or a variable-voltage, variable frequency (VVVF) drive. VSD 26 receives AC power having a particular fixed line voltage and fixed line frequency from AC power source 38 and provides AC power to motor 36 at desired voltages and desired frequencies, both of which can be varied to satisfy particular requirements. Control panel 35 can include a variety of different components, such as an analog to digital (A/D) converter, a microprocessor, a non-volatile memory, and an interface board, to control operation of system 10. Control panel 35 can also be used to control the operation of VSD 26, and motor 36.

Compressor 28 compresses a refrigerant vapor and delivers the vapor to condenser 30 through a discharge line. Compressor 28 can be any suitable type of compressor, for example, a screw compressor, a centrifugal compressor, a reciprocating compressor, a scroll compressor, etc. The refrigerant vapor delivered by compressor 28 to condenser 30 enters into a heat exchange relationship with a fluid, for example, air or water, and undergoes a phase change to a refrigerant liquid as a result of the heat exchange relationship with the fluid. The condensed liquid refrigerant from condenser 30 flows through an expansion device (not shown) to evaporator 32.

Evaporator 32 may include connections for a supply line and a return line of a cooling load. A secondary liquid, for example, water, ethylene, calcium chloride brine or sodium chloride brine, travels into evaporator 32 via return line and exits evaporator 32 via supply line. The liquid refrigerant in evaporator 32 enters into a heat exchange relationship with the secondary liquid to lower the temperature of the secondary liquid. The refrigerant liquid in evaporator 32 undergoes a phase change to a refrigerant vapor as a result of the heat exchange relationship with the secondary liquid. The vapor refrigerant in evaporator 32 exits evaporator 32 and returns to compressor 28 by a suction line to complete the cycle.

Figure 3:
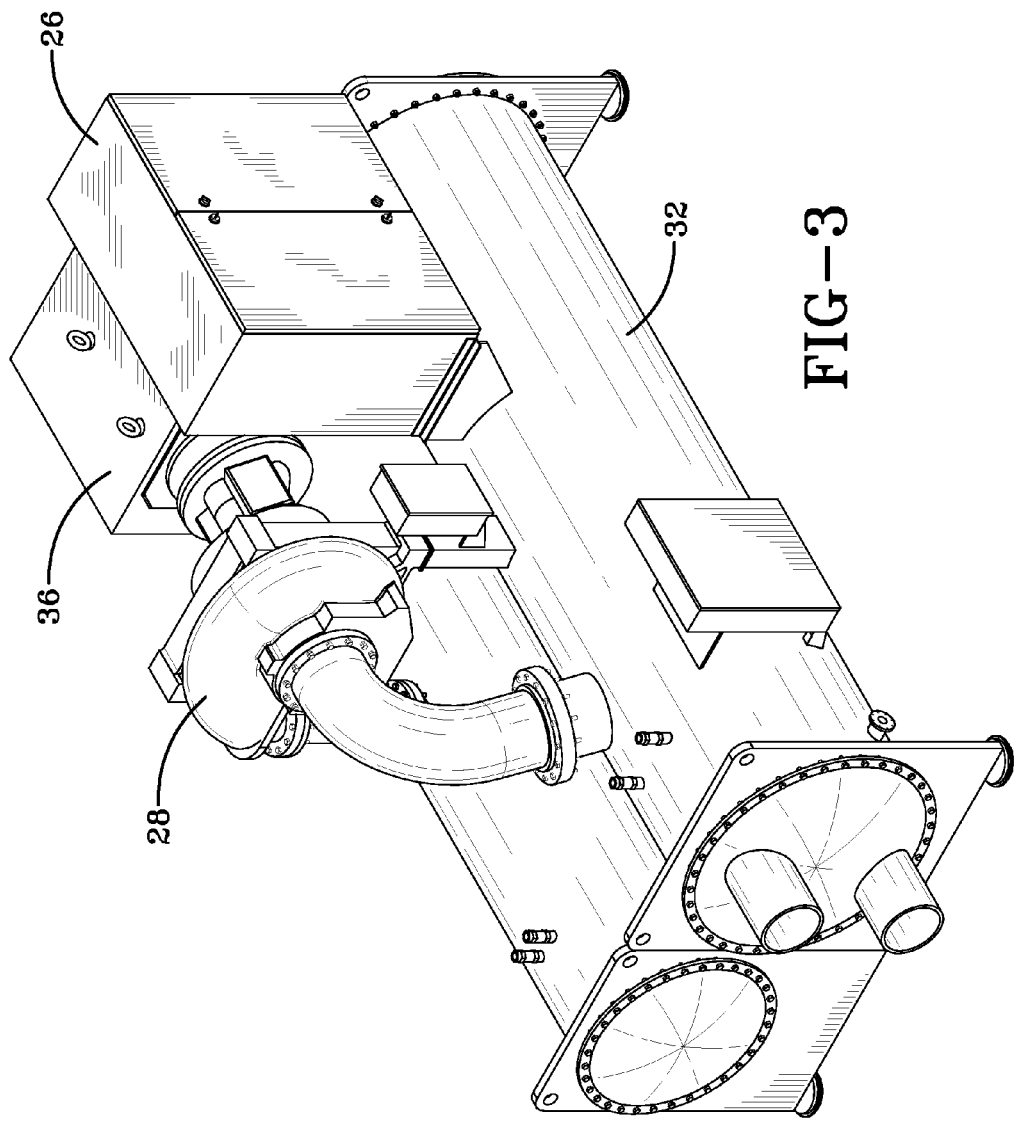
FIG. 3 shows an exemplary embodiment of a variable speed drive (VSD) mounted on a vapor compression system.

FIG. 3 shows an exemplary vapor compression system of an HVAC&R system. The VSD 26 is mounted on top of the evaporator 32, and adjacent to motor 36, and control panel 35. Motor 36 may be mounted on condenser 30 on the opposite side of evaporator 32. Output wiring (not shown) from VSD 26 is connected to motor leads (not shown) for motor 36, to power motor 36, which drives compressor 28.

Figure 4:
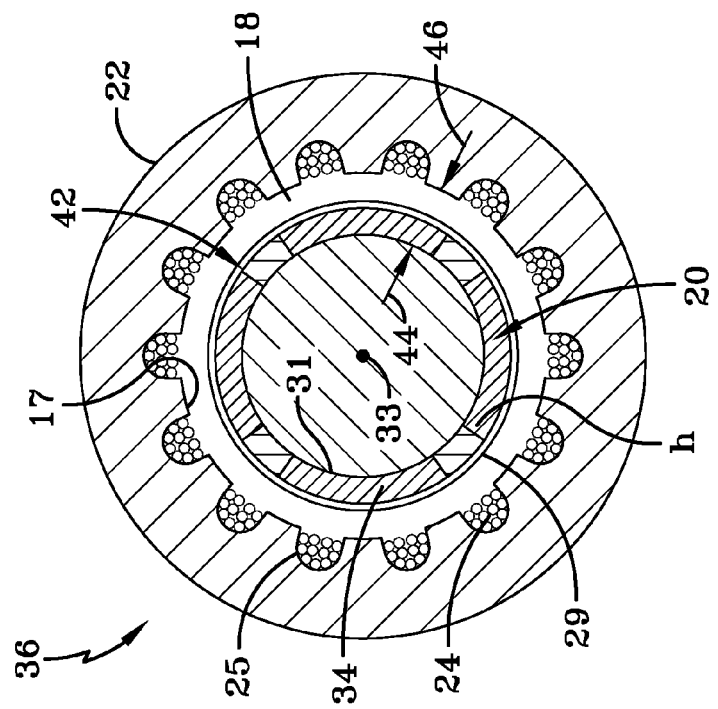
FIG. 4 is an exemplary schematic diagram of a permanent magnet synchronous motor.

Referring to FIG. 4, an exemplary PMSM 36 includes a stator portion 22. The stator portion 22 is configured substantially similar to a stator of a conventional induction motor. Stator portion 22 includes a plurality of windings 21 disposed in slots 25 defined by a plurality of adjacent teeth 17, symmetrically distributed about an inside radius of stator portion 22 adjacent to a rotor portion 20. Rotor portion 20 is disposed axially concentrically with and inside stator portion 22, rotor portion 20 and stator portion 22 separated by an air gap 18. Rotor portion 20 may include a cylindrical steel rotor frame or cage 31 with a plurality of permanent magnets 34 arranged peripherally on rotor cage 31. Permanent magnets 34 produce a magnetic field in air gap 18 as rotor portion 20 rotates. Permanent magnets 34 may be arranged to provide multiple pole arrangements, for example 2-pole or 4-pole, in rotor portion 20. Permanent magnets 34 may be adhesively affixed to cage 32, and are enveloped by a sleeve portion 29 to maintain permanent magnets 34 on cage 31 when centrifugal forces act on rotor portion 20 during rotation of PMSM 36. Sleeve portion 29 may be constructed of carbon fiber tubular sheet material, stainless steel or other similarly flexible, high strength, magnetically non-permeable material. Air gap 18 is small relative to an effective air gap g shown between opposing arrows 44, 46. It is desirable that air gap 18 be as narrow as possible. Effective air gap g includes the height h of permanent magnets 34 and sleeve portion 29.

Figure 5:
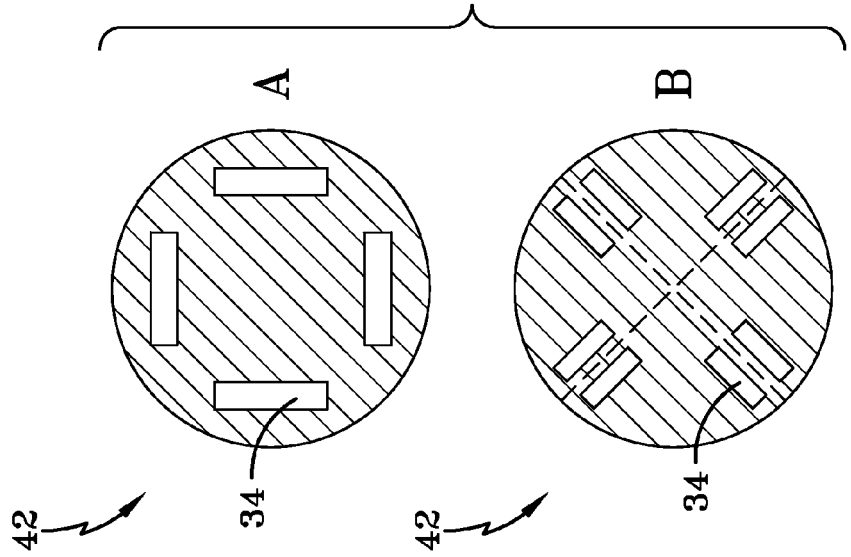
FIG. 5 is an exemplary schematic diagram of the rotor of an internal PMSM (IPM).

In another embodiment, PMSM 36 may be configured as an internal permanent magnet motor (IPM). FIG. 5 illustrates schematically an exemplary IPM rotor 42. The IPM 42 includes permanent magnets 34 implanted within rotor portion 20, rather than being mounted on the surface of rotor portion 20. PMSM 36

Figure 6:
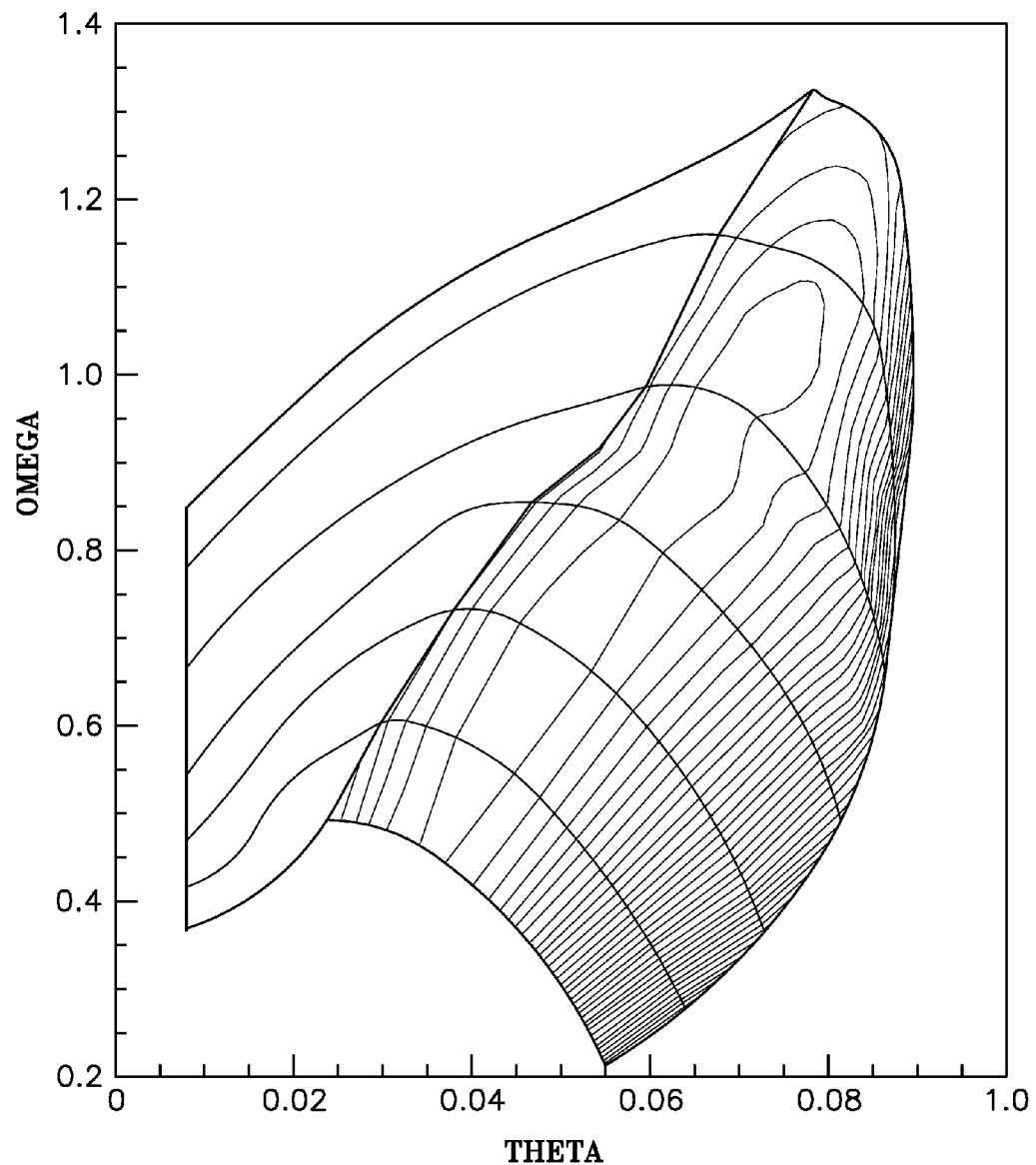
FIG. 6 shows an operating map of a compressor that may be used in the exemplary embodiments.
Figure 7:
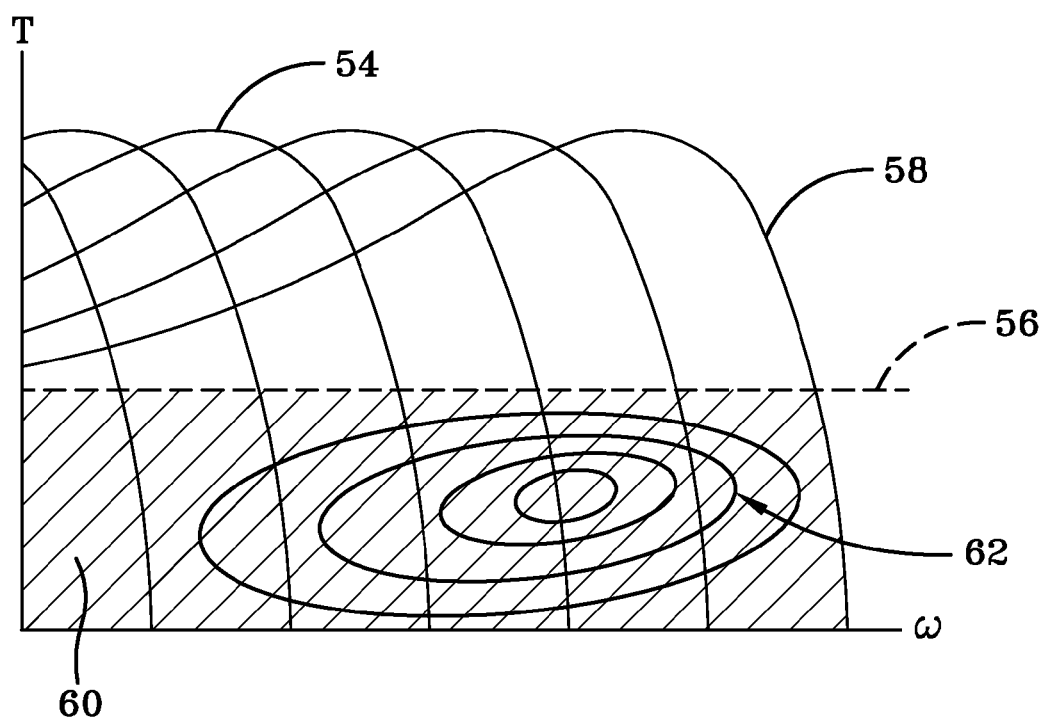
FIG. 7 shows an operating map of a motor that may be used in the exemplary embodiments.

Referring next to FIG. 6 and FIG. 7, PMSM 36, compressor 28 and VSD 26 may be optimized by analyzing operating maps of each system component concurrently. Each component, PMSM 36, compressor 28 and VSD 26 of the HVAC&R system may be characterized in terms of efficiency by operating characteristics maps. Motor operating characteristics may be illustrated by plotting motor efficiency as a function of motor speed and torque. VSDs similarly are characterized by plotting VSD efficiency as a function of VSD output current and frequency. Compressors are similarly characterized by plotting efficiency as a function of operating pressure and flow. By combining the operating maps associated with PMSM 36, compressor 28 and VSD 26 of the HVAC&R system, the overall HVAC&R system may be modeled to achieve the greatest combined efficiency. Further, each component of the HVAC&R system, that is, PMSM 36, compressor 28 and VSD 26, may be selected to correspond in rating with the most common operating conditions associated with the HVAC&R system. Alternately, optimization of the three components PMSM 36, compressor 28 and VSD 26, may be accomplished by adaptive controls that apply fuzzy logic algorithms which take into account a plurality of operational factors, for example, motor efficiency and operating parameters that change with motor temperature; the effects of rotor saturation, and the effects of stator teeth flux density saturation.

FIG. 6 is an exemplary operating map 50 of a compressor 28 applicable to vapor compression system 10. The parameters are as follows:

THETA=nondimensional flow rate

OMEGA=nondimensional isentropic head rise (similar to a pressure rise)

Values in compressor operating map 50 vary for specific compressors and configurations, e.g, diffuser settings and dimensions, impeller tip diameters and impeller tip widths, which values may be obtained from the compressor manufacturers or other sources. Efficiency contours, or efficiency islands are represented by the contour lines 52.

FIG. 7 is an exemplary operating map of a motor 36 applicable to HVAC system 11. A family of torque-speed curves for a variable speed induction motor is graphically depicted as lines 54. For a maximum torque, indicated by horizontal line 56, and a maximum speed, indicated by line 58, an exemplary operating range is defined. The operating range is indicated by a shaded area 60. A series of efficiency islands 62, indicated by concentric ellipses may be plotted for various operating efficiencies. Once the desired motor operating efficiency is selected, a corresponding compressor operating curve may be correlated with the selected efficiency islands to optimize a operating range for the two components, i.e., motor and compressor. Conversely, a compressor operating contour 52 may be selected and then correlated with a motor efficiency island 62 to optimize a operating range for the two components.

Similarly, VSD 26 may be characterized by an operating map (not shown) that defines operating efficiencies over a defined range. The operating map may then be correlated with one or both of the motor 36 and compressor 28, to further optimize some or all of the major components—VSD 26, compressor 28 and motor 36.

While only certain features and embodiments of the invention have been illustrated and described, many modifications and changes may occur to those skilled in the art (for example, variations in sizes, dimensions, structures, shapes and proportions of the various elements, values of parameters (for example, temperatures, pressures, etc.), mounting arrangements, use of materials, colors, orientations, etc.) without materially departing from the novel teachings and advantages of the subject matter recited in the claims. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A vapor compression system comprising:
    a compressor, a condenser, and an evaporator connected in a closed refrigerant loop;
    a permanent magnet synchronous motor connected to the compressor to power the compressor; and
    a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising:
    a converter connectable to an AC power source providing the input AC voltage, the converter being configured to convert the input AC voltage to a DC voltage;
    a DC link connected to the converter, the DC link being configured to filter and store the DC voltage from the converter;
    an inverter connected to the DC link; and
    a controller configured to reference a first operating map associated with the compressor, a second operating map associated with the motor, and a third operating map associated with the variable speed drive; the controller further configured to analyze the first operating map, second operating map and third operating map concurrently to select an operating point for the vapor compression system.

2. The system of claim 1, wherein the controller is further configured to model the vapor compression system to achieve the greatest combined efficiency.

3. The system of claim 1, wherein each of the motor, compressor and VSD is selected to correspond in rating with one or more common operating conditions associated with the vapor compression system.

4. The system of claim 1, wherein the permanent magnet synchronous motor further comprises a plurality of permanent magnets arranged in multiple pole arrangements in a rotor portion.

5. The system of claim 4, wherein the plurality of permanent magnets being adhesively affixed to a rotor cage, the plurality of permanent magnets enveloped by a sleeve to maintain the plurality of permanent magnets on the rotor cage when centrifugal forces act on rotor portion during rotation.

6. The system of claim 5, wherein the rotor cage is a cylindrical steel rotor cage.

7. The system of claim 6, wherein the sleeve comprises a flexible, high strength, magnetically non-permeable material.

8. The system of claim 7, wherein the material is carbon fiber tubular sheet material or stainless steel.

9. A chiller system comprising:
- a compressor, a condenser, and an evaporator connected in a closed refrigerant loop;
- a permanent magnet synchronous motor connected to the compressor to power the compressor; and
- a variable speed drive connected to the motor, the variable speed drive being configured to receive an input AC power at a fixed input AC voltage and a fixed input frequency and provide an output power at a variable voltage and variable frequency to the motor, the variable voltage having a maximum voltage greater in magnitude than the fixed input AC voltage and the variable frequency having a maximum frequency greater than the fixed input frequency, the variable speed drive comprising:
  - a converter connectable to an AC power source providing the input AC voltage, the converter being configured to convert the input AC voltage to a DC voltage;
  - a DC link connected to the converter, the DC link being configured to filter and store the DC voltage from the converter stage; and
  - an inverter connected to the DC link; and
  - a controller configured with adaptive controls to apply a fuzzy logic algorithm for optimization of the motor, the compressor and the variable speed drive;
- wherein the fuzzy logic algorithm is based on a plurality of operational factors of the chiller system, the plurality of operational systems including an effect of a rotor saturation, and an effect of a stator teeth flux density saturation of the permanent magnet synchronous motor.

10. The chiller system of claim 9, wherein optimization is accomplished by taking into account the plurality of operational factors of the chiller system.

11. The chiller system of claim 10, wherein the plurality of operational factors further includes motor efficiency, and operating parameters that change with motor temperature.

12. The chiller system of claim 11, each of the motor, compressor and VSD selected to correspond in rating with one or more operating conditions associated with the chiller system.

* * * * *